Nov. 27, 1956 R. E. HENNESSY 2,772,114
ADJUSTABLE ATTACHMENT MEANS FOR
A MOTOR VEHICLE FABRIC TOP
Filed Aug. 27, 1953 2 Sheets-Sheet 1

INVENTOR.
R. E. HENNESSY.
BY E. C. McRae
J. R. Faulkner
T. H. Oster
ATTORNEYS

Nov. 27, 1956   R. E. HENNESSY   2,772,114
ADJUSTABLE ATTACHMENT MEANS FOR
A MOTOR VEHICLE FABRIC TOP
Filed Aug. 27, 1953   2 Sheets-Sheet 2

INVENTOR.
R. E. HENNESSY.
BY E.C. McRae
J.R. Faulkner
T.H. Orten
ATTORNEYS

Patent text page

2,772,114
ADJUSTABLE ATTACHMENT MEANS FOR A MOTOR VEHICLE FABRIC TOP

Robert E. Hennessy, Allen Park, Mich., assignor to Ford Motor Company, Dearborn, Mich., a corporation of Delaware Application August 27, 1953, Serial No. 376,907

9 Claims. (Cl. 296—107)

This invention relates to motor vehicles of the convertible type and particularly to means for attaching the top material to the vehicle body.

An object of the present invention is to provide a convertible body in which the fabric top material is extended downwardly within the rearward portion of the vehicle body and is attached to retaining strips movably mounted within the body. For example, the lower marginal edge of the top material may be secured to a tacking strip which in turn is supported by means of a retaining strip for movement along an inner body panel. Means may be provided for adjustably moving the retaining strip along the panel so as to change the position thereof, and spring means may be provided to resiliently urge the retaining strip and the lower edge of the top material downwardly to tension the same.

Other objects and advantages of this invention will be made more apparent as this description proceeds, particularly when considered in connection with the accompanying drawings, wherein.

Figure 1:
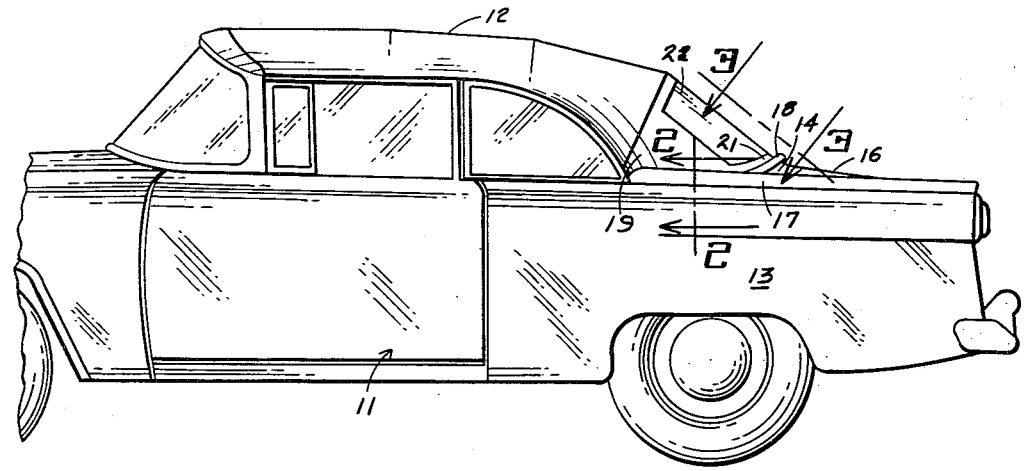
Figure 1 is a side elevational view of a motor vehicle body of the convertible type, incorporating the present invention.

Referring now to the drawings, and particularly to Figure 1, the reference character 11 indicates a vehicle body of the convertible type having a retractable fabric top 12 conventionally movable from the raised position shown to a retracted position within the well provided within the vehicle body. Rear side panels 13 at each side of the body cooperate with a fixed rear deck panel 14 and a hinged rear deck lid 16 to define at the rearward portion of the body a luggage compartment and also a well to receive the top material when retracted. A longitudinally extending decorative belt molding 17 is provided at each side of the body, being secured to the upper marginal edge of the side panel 13. A rear molding 18 is secured to the upper marginal edge of the fixed rear deck panel 14 generally in horizontal alignment with the side belt moldings 17.

The fabric top 12 has side flaps 19 adjacent the rearward portion at each side and a central flap 21 at the rearward portion of the top between the side flaps 19 and beneath the rear light 22. In the embodiment shown in the drawing, the side flaps 19 and the rear flap 21 are separately attached to the vehicle body, as will be described, although if desired the attachment means for all three portions of the rearward part of the fabric top may be combined.

Figures 2, 4:
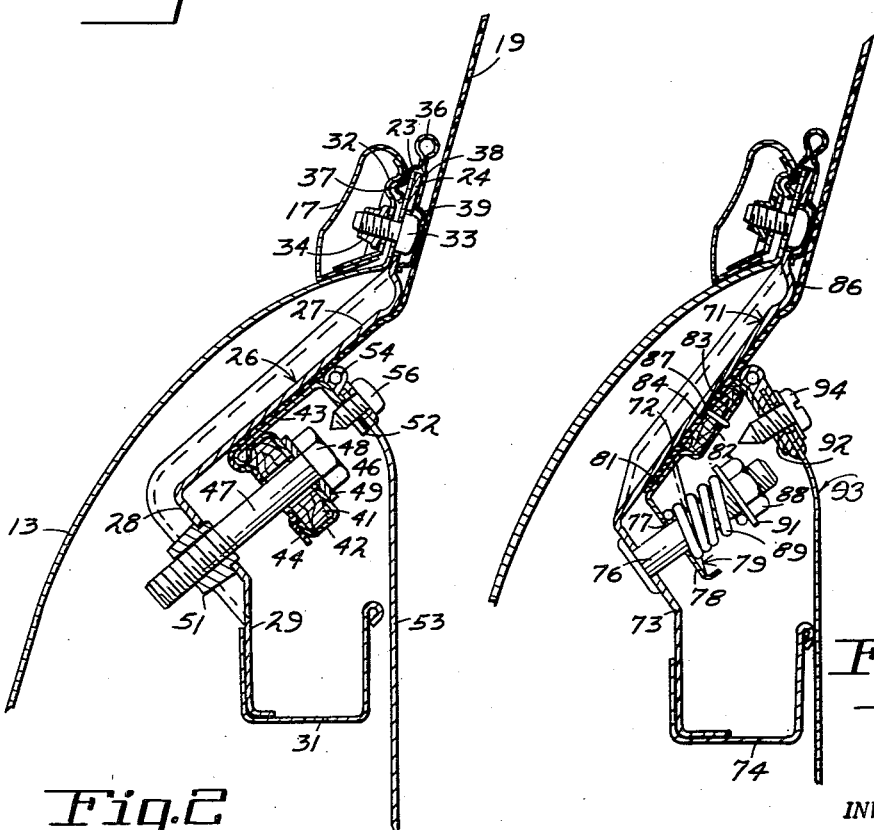
Figure 2 is an enlarged cross-sectional view taken on the plane indicated by the line 2—2 of Figure 1.
Figure 4 is a vertical cross-sectional view similar to Figure 2 but illustrating a modification.

Figure 2 illustrates the construction at the side of the vehicle body, showing the attachment between a side flap 19 and the body. It will be noted that the rear side panel 13 of the body is formed with an upper marginal flange 23 welded to an upper marginal flange 24 of an inner body panel 26. The inner panel 26 has a flat intermediate portion 27 extending downwardly from the upper marginal flange 24 at an incline to a vertical plane. A second intermediate portion 28 is formed at right angles to the first intermediate portion 27 and joins an integral downwardly extending lower marginal flange 29. A channel-shaped drain trough 31 is secured to the lower marginal flange 29 of the inner panel.

The side belt molding 17 is secured to the upper marginal flange 23 of the rear side panel 13 of the vehicle body by means of retaining clips 32 secured to the flange 23 by means of fastening elements 33 and nuts 34. A hole is provided in the upper marginal flange 24 of the inner panel to accommodate the head of the fastening elements 33. The upper edges of the marginal flanges 23 and 24 of the outer and inner body panels are trimmed by means of a cylindrical bead 36 integrally provided with spring legs 37 and 38 engaging opposite sides of the juxtaposed marginal flanges 23 and 24. The inner spring leg 38 is provided with an inwardly offset portion 39 covering the head of the head of the fastening element 33.

A wood tacking strip 41 is supported by a formed metal retaining strip 42 having a side flange 43 extending along the inner side of the flat intermediate portion 27 of the inner body panel 26. The side flap 19 of the fabric top 12 of the vehicle body extends downwardly into the vehicle body on the inner side of the side panel 13 and the inner panel 26, and extends between the flat intermediate portion 27 of the inner panel 26 and the side flange 43 of the retaining strip 42. The lower marginal edge 44 of the side flap 19 is extended around the lower portion of the retaining strip 42 and is tacked by conventional means to the tacking strip 41 carried thereby.

At spaced intervals along the length of the retaining strip 42 and the tacking strip 41, the latter are provided with openings 46 receiving bolts 47. The head 48 of each bolt 47 rests against a washer 49 which in turn engages the upper wall of the retaining strip 42. The lower threaded end of each bolt 47 threadedly engages a clinch nut 51 secured to the intermediate portion 28 of the inner body panel 26.

This construction permits adjustment of the lower portion of the side flap 19 of the fabric top simply by adjusting the bolts 47 to move the tacking strip 41, to which the lower marginal portion 44 of the top is secured, either upwardly or downwardly along the inner body panel 26. This can be adjusted during the initial trimming of the vehicle body to insure the proper positioning of the side flaps so as to eliminate looseness and provide the requisite tautness when the top is raised. In addition, adjustment can be made at any time after initial installation, if needed.

Water entering the vehicle body between the side flap 19 and the inner body panel 26 will be received within the drain trough 31. The drain trough 31 is arranged to drain water received therein to a point exteriorly of the vehicle body.

The retaining strip 42 is provided with an upper marginal flange 52 extending inwardly at right angles to the inner body panel 26. An upholstery trim panel 53, provided with a binding 54 at the upper edges is secured to the marginal flange 52 by means of fastening elements 56.

Figure 3:
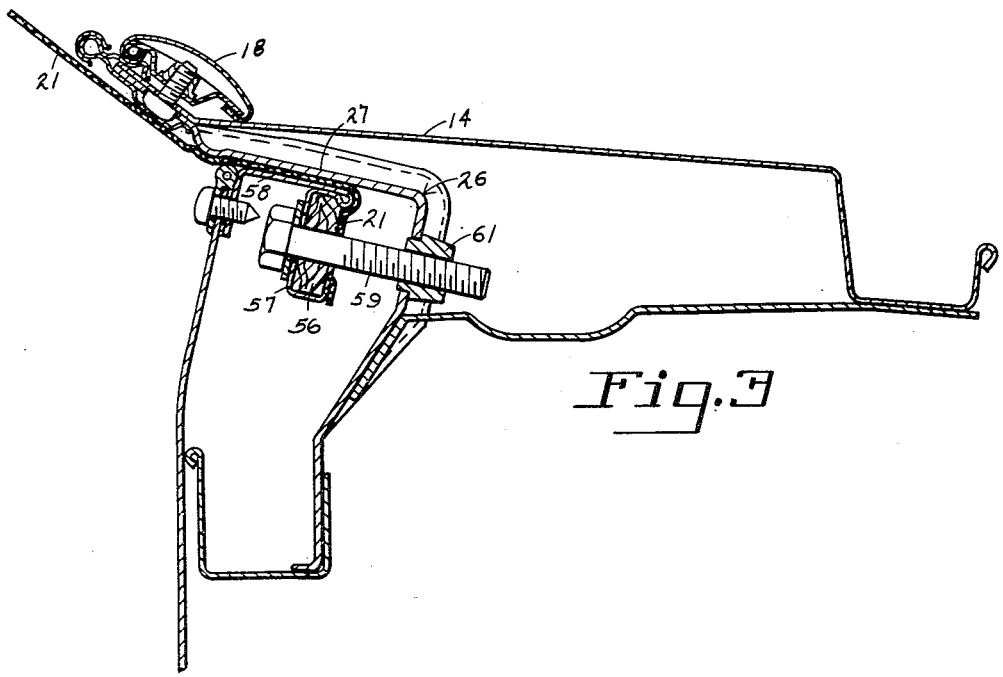
Figure 3 is an enlarged vertical cross-sectional view taken along the longitudinal center line of the car substantially as indicated at 3—3 of Figure 1.

Figure 3 illustrates the construction used between the rear flap 21 and the rear deck panel 14. In this area the inner body panel 26 varies from the configuration of the inner panel at the side of the car, but is formed integrally therewith. The intermediate portion 27 in this area is more nearly horizontal, because of the greater inclination of the rear flap 21. Consequently, a separate tacking strip 56 is used in this area, being held within a retaining strip 57 having an upper flange 58 arranged for sliding movement along the intermediate portion 27 of the inner panel. The lower portion of the rear flap 21 of the top material is stretched around the retaining strip 57 between the flange 58 thereof and the portion 27 of the inner body panel, and is conventionally secured to the tacking strip 56. Laterally spaced bolts 59 extend through the tacking strip and retaining strip and engage clinch nut 61 to permit adjustment of the lower portion of the rear flap 21 of the fabric top longitudinally along the portion 27 of the inner body panel.

Reference is now made to Figure 4 which illustrates a modification. In this construction the inner body panel 71 is formed with an intermediate downwardly inclined portion 72 and with an oppositely inclined lower portion 73 supporting the drain trough 74. A series of spaced studs 76 are mounted in the lower flange 73 of the inner body panel 71. The studs 76 project through openings 77 formed in the lower flange 78 of a sheet metal retaining strip 79. The intermediate flange 81 of the retaining strip 79 extends along the intermediate portion 72 of the inner body panel 71 for sliding movement therealong.

The upper ends of the studs 76 are threaded and receive adjustable nuts 88. A coil spring 89 encircles each of the studs 76 between the lower flange 78 of the retaining strip and a washer 91 seated against the nut 88.

The tension upon the coil spring 89 can be varied as desired by adjustment of the nuts 88 on the studs 76.

It will be apparent from the foregoing that the coil springs 89 exert a constant spring pressure against the retaining strip 79 to urge the latter downwardly along the downwardly inclined intermediate portion 72 of the inner body panel 71, and consequently exert a constant tension upon the top material 86. This spring pressure tightens the top material and removes wrinkles therefrom, insuring a good fit.

The retaining strip 79 is formed with an upper flange 92 forming a support for the upper edge of the interior trim material 93 which is secured thereto by means of screws 94.

Figure 5:
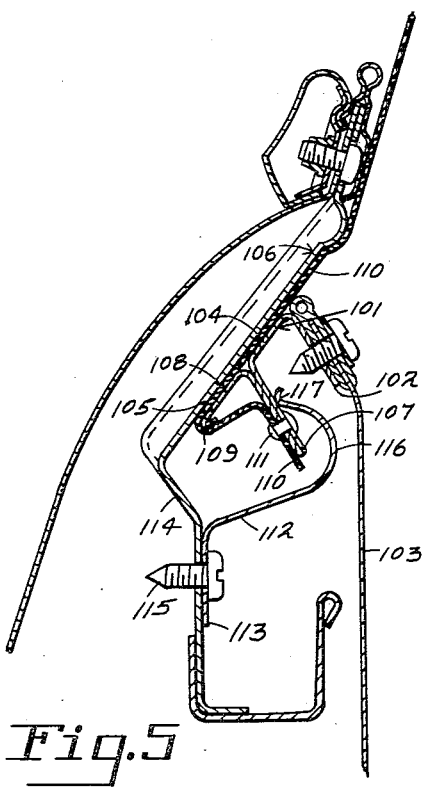
Figure 5 is another vertical cross-sectional view similar to Figures 2 and 4 but illustrating another modification.

Figure 5 illustrates a second modification utilizing a sheet metal retaining strip 101 having an upper flange 102 to which the upper edge of the interior material 103 is secured. An intermediate portion 104 of the retaining strip extends parallel to the intermediate portion 105 of the inner body panel 106, and is bent downwardly at its lower edge to form a double thickness intermediate flange 107. The return bent flange 107 continues into a marginal flange 108 forming a continuation of the intermediate portion 104, and the lower edge of the marginal flange 108 is bent upwardly to form a bead 109. The lower portion of the top material 110 is stretched over the intermediate portion 104 and the marginal flange 108 of the retaining strip, then around the bead 109, and is finally secured to the double thickness intermediate flange 107 by means of rivets 111.

A series of spaced flat spring clips 112 are utilized to exert a constant pressure upon the retaining strip 101 to urge the latter downwardly along the intermediate wall 105 of the inner body panel and to thus exert a constant tension upon a top material 110. The lower flanges 113 of the spring clips 112 are secured to the downwardly extending flange 114 of the inner body panel by means of screws 115. The upper portion of each spring clip is formed with a looped portion 116 and with a return bent end 117 engaging the upper surface of the double thickness intermediate flange 107 to exert a pressure thereon. The spring 112 is under an intial tension when in the position shown.

It will be understood that the invention is not to be limited to the exact construction shown and described, but that various changes and modifications may be made without departing from the spirit and scope of the invention, as defined in the appended claims.

What is claimed is:

1. In a motor vehicle body, a fixed outer body panel having its upper marginal edge terminating adjacent the belt line of the vehicle, an inner body panel secured to said outer body panel adjacent the inner side thereof and having a downwardly inclined portion, a retractable fabric top for the vehicle body having a rearward portion extending downwardly below the upper marginal edge of the outer body panel and adjacent the inner side of the inner body panel, a retaining strip mounted for sliding movement along the inner side of the downwardly inclined portion of the inner body panel, means securing the downwardly extending rearward portion of the fabric top to said retaining strip, and means for moving said retaining strip along the downwardly inclined portion of the inner body panel to adjust the downwardly extending rearward portion of the fabric top.

2. In a motor vehicle body, a fixed outer body panel having its upper marginal edge terminating adjacent the belt line of the vehicle, an inner body panel having its upper marginal edge secured to the upper marginal edge of said outer body panel and having a flat portion extending downwardly therefrom, a retractable fabric top for the vehicle body having a rearward portion extending downwardly within said vehicle body adjacent the inner side of the flat portion of said inner body panel, a retaining strip slidably mounted adjacent the inner side of said flat portion, a tacking strip carried by said retaining strip, means securing the lower marginal edge of the downwardly extending portion of the fabric top to said tacking strip, and resilient spring means engaging said retaining strip urging said retaining strip and the rearward portion of said fabric top downwardly to tighten the same.

3. The structure defined by claim 2 which is further characterized in that a stud is mounted upon said body panel and projects through an opening in said retaining strip, said spring means comprising a coil spring encircling said stud and bearing against said retaining strip to urge the latter downwardly.

4. The structure defined by claim 2 which is further characterized in that said spring means comprises a flat resilient spring clip having one portion secured to said inner body panel and having another portion resiliently engaging said retaining strip to urge the latter downwardly.

5. The structure defined by claim 1 which is further characterized in that said retaining strip and said inner body panel are interconnected by means of a bolt and nut to permit adjustment of said retaining strip relative to said inner body panel to tighten the fabric top.

6. In a motor vehicle body, a fixed body panel, a retractable fabric top for the vehicle body extending downwardly within said vehicle body on the inner side of said body panel, a fixed guide member secured to said vehicle body inwardly of said body panel, a retaining strip mounted within said body for sliding movement along said guide member, means connecting the lower portion of said vehicle top to said movable retaining strip, and means for varying the position of said retaining strip.

7. In a motor vehicle body, a fixed outer body panel having its upper marginal edge terminating adjacent the belt line of the vehicle, an inner body panel having an upper marginal edge secured to the upper marginal edge of the outer body panel and having a downwardly extending portion inclined relative to a vertical plane in an outward direction, a drain trough secured to the lower edge of said inner body panel, a retractable fabric top for the vehicle body having a rearward portion extending downwardly within the vehicle body adjacent the inner side of the downwardly inclined portion of the inner body panel, a retaining strip slidably mounted adjacent said inclined portion of the inner body panel, a tacking strip carried by said retaining portion, means connecting the lower edge of the fabric top to said tacking strip, and spring means yieldably urging said retaining strip downwardly along the inclined portion of said inner body panel to tension said fabric top.

8. In a motor vehicle body, a fixed outer body panel having its upper marginal edge terminating adjacent the belt line of the vehicle, a support fixedly mounted with respect to said vehicle body beneath said belt line and interiorly of the outer body panel, a retractable fabric top for the vehicle body having a portion extending downwardly within said vehicle body beneath said belt line, a retaining strip secured to the lower portion of said fabric top beneath said belt line, a plurality of threaded adjustable members securing said retaining strip to said support to permit adjustment of said retaining strip to vary the tension on said fabric top, said threaded adjusting members comprising bolts carried by said support, and a coil spring encircling each of said bolts and bearing against said retaining strip to urge the latter downwardly.

9. In a motor vehicle body, a fixed outer body panel having its upper marginal edge terminating adjacent the belt line of the vehicle, a support fixedly mounted with respect to said vehicle body beneath said belt line and interiorly of the outer body panel, a retractable fabric top for the vehicle body having a portion extending downwardly within said vehicle body beneath said belt line, a retaining strip secured to the lower portion of said fabric top beneath said belt line, and a plurality of adjustable members securing said retaining strip to said support to permit adjustment of said retaining strip to vary the tension on said fabric top, an interior trim wall, said members being attached to said interior trim wall, an exterior body wall, said interior wall being flexible and urged toward said exterior wall, said top being interposed said interior and exterior walls, said adjustable members urging said interior wall downwardly and outwardly whereby said interior wall is urged into contact with said top and urged against said exterior wall.

References Cited in the file of this patent

UNITED STATES PATENTS

| | | |
|---|---|---|
| 1,809,505 | Campbell | June 9, 1931 |
| 2,569,724 | Mackie et al. | Oct. 2, 1951 |
| 2,649,330 | Schamel et al. | Aug. 18, 1953 |

FOREIGN PATENTS

| | | |
|---|---|---|
| 217,919 | Great Britain | Oct. 23, 1924 |